United States Patent [19]

Knauss et al.

[11] Patent Number: 4,847,222

[45] Date of Patent: Jul. 11, 1989

[54] BASIC REFRACTORY SHAPES

[75] Inventors: Richard J. Knauss, Clairton; David J. Michael, White Oaks, both of Pa.

[73] Assignee: Dresser Industries, Inc., Dallas, Tex.

[21] Appl. No.: 46,238

[22] Filed: May 4, 1987

[51] Int. Cl.$^4$ ............................................. C04B 35/48
[52] U.S. Cl. ................................... 501/104; 501/102; 251/326
[58] Field of Search ....................... 501/102, 103, 104; 251/326

[56] References Cited

U.S. PATENT DOCUMENTS

| | | | |
|---|---|---|---|
| 3,416,938 | 12/1968 | Alper et al. | 501/104 |
| 3,520,706 | 7/1970 | Davies et al. | 501/102 |
| 4,010,039 | 3/1977 | de Aza et al. | 501/104 |
| 4,179,046 | 12/1979 | Jeschke et al. | 222/600 |
| 4,220,269 | 9/1980 | Beckers et al. | 251/326 |
| 4,338,963 | 7/1982 | Frame | 251/326 |
| 4,415,674 | 11/1983 | Johnson | 501/104 |
| 4,461,843 | 7/1984 | McGarry et al. | 501/102 |
| 4,506,022 | 3/1985 | Whittemore et al. | 501/100 |

FOREIGN PATENT DOCUMENTS

| | | | |
|---|---|---|---|
| 49-096005 | 9/1974 | Japan | 501/104 |
| 49-118708 | 11/1974 | Japan | 501/104 |
| 0611246 | 10/1948 | United Kingdom | 501/104 |
| 1413522 | 11/1975 | United Kingdom | |
| 1424826 | 2/1976 | United Kingdom | |

Primary Examiner—William R. Dixon, Jr.
Assistant Examiner—Anthony J. Green
Attorney, Agent, or Firm—Sigalos, Levine & Montgomery

[57] ABSTRACT

A basic refractory shape resulting from firing a batch consisting essentially of a magnesite and a zirconia; said batch containing for each 100 percent by weight thereof about 3 to 20 percent by weight of coarse zirconia having a particle size of 150-mesh Tyler, or greater, and 0 to 20 percent by weight of fine zirconia having a particle size of finer than 150-mesh Tyler and a slide gate assembly comprising at least one such shape.

5 Claims, No Drawings

BASIC REFRACTORY SHAPES

BACKGROUND OF THE INVENTION

The present invention relates to basic refractory shapes, particularly those suitable for use in slide gate assemblies and nozzles for steel casting applications and for use in other metallurgical vessels where it is desired to have high thermal shock resistance and resistance to chemical erosion.

At the present time basic refractory shapes are used in steel casting applications; such as, for example, slide gates and nozzles. Basic refractories are those made of magnesium oxide, often referred to commercially as "deadburned magnesite" or simply "magnesite". Such slide gates or nozzles are principally used in the casting of high manganese steels since burned mullite-bonded high alumina slide gates or plates are much more susceptible to chemical attack by such steels.

Presently, however, such basic refractories do not have the desired degree of resistance to chemical erosion or thermal shock; particularly when attacked by molten steel and slag.

SUMMARY OF THE INVENTION

It has now been found that basic refractory shapes, particularly slide gates, nozzles and other refractory shapes utilized in the casting of steel, can be made more thermal shock resistant and resistant to chemical erosion; thus, leading to longer service life and minimizing the problems of chemical erosion and cracking from thermal shock.

Briefly, the present invention comprises a basic refractory shape resulting from firing a refractory batch consisting essentially of magnesite and zirconia; said batch containing for each 100 percent by weight thereof, 3 to 20 percent by weight of coarse zirconia having a particle size of 150-mesh Tyler, or greater, and 0 to 20 percent by weight of fine zirconia having a particle size of finer than 150-mesh Tyler.

DETAILED DESCRIPTION

The essential elements of the instant invention are the magnesite and zirconia and, in particular, the relationship between the purity of the magnesite and the particle size of the zirconia.

With respect to the magnesite, it is preferred to use a pure magnesite that is greater than 98% by weight MgO. However, with the instant invention by adjusting the lime-to-silica ratio in the magnesite, it is possible to utilize magnesites that are much less pure; down, for example, to 96% by weight MgO, without any loss in the hot strength of the resultant refractory shape. This is done by regulating the amount of lime present in the magnesite grain in relation to the silica and, in particular, it has been found that even without adjustment of the lime-to-silica ratio, it is possible to get adequate refractoriness when using magnesites of less than 98% by weight purity if the proper amount and sizing of zirconia is used, as set forth in greater detail below.

The suitable lime-to-silica ratio depends on both the overall purity of the magnesite and the amount and sizing of the zirconia used. However, in all cases, the desired lime-to-silica ratio will be greater than 1.88 to 1, on a weight basis. As the magnesite used increases in purity, the influence of the lime-to-silica ratio is less critical.

With respect to the zirconia, it is preferred to use baddeleyite because it is inexpensive; although, any other zirconia such as synthetically prepared or fused zirconia or zirconia prepared from dissociation of zircon can also be utilized. The zirconia can either be used stabilized or unstabilized. It is well known in this art that it is common to stabilize zirconia with materials such as CaO, MgO, and $Y_2O_3$. This stabilization is done to prevent conversion of the crystal structure from the cubic or tetragonal structure to the monoclinic structure on cooling. There is a volume change associated with this conversion of zirconia that could make the article friable and weak or subject to cracking. With the instant invention it is not necessary to stabilize the zirconia since if unstabilized zirconia is used it will be stabilized by the magnesium oxide during firing of the refractory-shaped form, for example, the slide gate or nozzle.

The proportions of magnesite and zirconia in the batch can range from 60 to 97 percent by weight magnesite and, correspondingly, 40 to 3 percent by weight zirconia.

A most important aspect of the instant invention and, in fact, critical is the sizing of the zirconia in order to achieve the desired spalling resistance. It is essential that there be from about 3 to 20 percent by weight of coarse zirconia having a particle size of 150-mesh Tyler, or greater. The essential component is the coarse zirconia for spalling resistance but, if it is desired to obtain optimum resistance to chemical attack from high manganese steels and slag, amounts of fine zirconia (i.e., less than 150-mesh Tyler) are preferably added; i.e., from about 1 to 20 percent by weight.

Interestingly, with the present invention, the particular amount of the fine and coarse zirconia utilized will vary within the ranges noted depending upon the type of magnesite (i.e., the purity thereof) as well as the particle size of the coarse zirconia. It has been noted that smaller amounts of the coarse zirconia are needed to give adequate spalling resistance as the particle size of the zirconia increases. The particular quantity and sizing of the coarse zirconia for any given magnesite and desired spalling resistance and chemical resistance can be determined by routine experimentation, simply adding it to the desired magnesite at the various levels and noting when the greatest spalling resistance and resistance to chemical attack is found.

A binder is added to bind the mix and assist it in holding the shape to which it is formed; as by pressing, during subsequent handling before it is fired. It can be any binder conventionally used in making basic refractories; such as lignosulphonates, methyl cellulose, dextrin, ethyl cellulose, and the like and in the conventional amount; about at least 2.5 percent by weight. These binders are burned out when the shape is fired.

It is also conventional to add as plus additions to the mixes other materials as processing aids. Oil and water, for example, can be added for purposes of proper lubrication during pressing and proper pressing consistency, respectively.

The particular refractory shapes can be made by simply admixing the magnesite, zirconia and binder, forming them into the desired shape; as by pressing, and firing them at temperatures of from about 2700° to 3100° F. as is conventional.

The invention will be further described in connection with the following examples which are set forth for purposes of illustration only.

EXAMPLES 1-7

A series of seven tests were carried out with varying particle size zirconia and the spalling resistance measured. The particulars of each mix and the results of the testing are set forth in Table I below.

TABLE I

| | Example: | | | | | | |
|---|---|---|---|---|---|---|---|
| | 1 | 2 | 3 | 4 | 5 | 6 | 7 |
| Mix: | | | | | | | |
| Deadburned Magnesite | | | | | | | |
| −10 on 28 mesh | 49% | 49% | 49% | 49% | 48% | 49% | 48% |
| −28 mesh | 23 | 18 | 17 | 18 | 17 | 17 | 14 |
| BM 60 | 12 | 20 | 15 | 15 | 20 | — | — |
| BM 90 | 16 | 8 | 8 | 3 | 10 | 25 | 23 |
| Zirconia | | | | | | | |
| A* | — | 5 | 10 | 15 | — | — | — |
| B** | — | — | — | — | 5 | 10 | 15 |
| Plus additions: | | | | | | | |
| Lignosulfonate | 3.9 | 3.8 | 3.8 | 3.8 | 3.8 | 3.8 | 3.8 |
| Oil | 0.6 | 0.5 | 0.5 | 0.5 | 0.5 | 0.5 | 0.5 |
| Water | 0.3 | — | — | — | — | — | — |
| Burn: | 2850° F., 2 Hour Hold | | | | | | |
| % Linear Change in Burning: | −0.2 | −0.4 | −0.4 | −0.4 | −0.2 | 0.0 | +0.2 |
| Bulk Density, pcf, (Av 6): | 184 | 191 | 198 | 203 | 189 | 193 | 196 |
| Apparent Porosity, % (Av 3): | 16.4 | 15.4 | 14.2 | 14.5 | 17.0 | 17.2 | 17.7 |
| Modulus of Rupture, psi, (Av 3) | | | | | | | |
| At Room Temp: | 2180 | 4020 | 3780 | 3330 | 1350 | 1190 | 1070 |
| At 2700° F.: | 1180 | 1060 | 1570 | 2250 | 380 | 350 | 690 |
| Propane Oxygen Flame Impingement-POFI-Test* | | | | | | | |
| Degree of Cracking: | mod | sl | sev | sl | none | none | none |
| Degree of Spalling: | sl | mod | sl | sl | none | none | none |
| Rating: | fail | fail | fail | fail | pass | pass | pass |

*Less than 2 microns in particle size
**−35 on 65 mesh = 17%; −65 on 150 mesh - 47%; −150 on 325 mesh = 36%; −325 mesh = 0%
*sl—slight; mod—moderate; sev—severe These data show that Mix 1, with no zirconia addition, had poor spalling resistance, as indicated by its failure to pass the POFI test. Mixes 2, 3, and 4, which contained fine zirconia, also failed the POFI test. However, Mixes 5, 6, and 7, which contained coarser zirconia B passed the POFI test.

EXAMPLES 8-13

A series of six tests were carried out relative to the coarseness of the zirconia and its effect on the POFI test. The particulars of each mix and the results of the tests are set forth in Table II below.

TABLE II

| | Example: | | | | | |
|---|---|---|---|---|---|---|
| | 8 | 9 | 10 | 11 | 12 | 13 |
| Mix: | | | | | | |
| Deadburned Magnesite | | | | | | |
| −10 on 28 mesh | 49% | 48% | 49% | 49% | 49% | 48% |
| −28 mesh | 17 | 17 | 18 | 17 | 18 | 14 |
| BM 60 | 20 | 20 | 15 | — | 15 | — |
| BM 90 | 9 | 10 | 8 | 25 | 3 | 23 |
| Zirconia | | | | | | |
| BMF 80* | 5 | — | 10 | — | 15 | — |
| B | — | 5 | — | 10 | — | 15 |
| Plus additions: | | | | | | |
| Lignosulphonate | 3.80 | | | | | |
| Oil | 0.50 | | | | | |
| Burn: | 2850° F., 2 Hour Hold | | | | | |
| % Linear Change in Burning: | −0.2 | −0.2 | −0.2 | −0.0 | −0.2 | +0.2 |
| Bulk Density, pcf, (Av 6): | 189 | 189 | 191 | 193 | 194 | 196 |
| Apparent Porosity, % (Av 3): | 16.0 | 17.0 | 16.4 | 17.2 | 17.1 | 17.7 |
| Modulus of Rupture, psi, (Av 3) | | | | | | |
| At Room Temp: | 2390 | 1350 | 2500 | 1190 | 2370 | 1070 |
| At 2700° F.: | 540 | 380 | 850 | 350 | 1400 | 690 |
| Propane Oxygen Flame Impingement-POFI-Test | | | | | | |
| Degree of Cracking: | mod | none | mod | none | mod | none |
| Degree of Spalling: | sev | none | sev | none | sev | none |
| Rating: | fail | pass | fail | pass | fail | pass |

*80% is −325 mesh Tyler

EXAMPLE 14

In Examples 2 to 4, and 8, 10 and 12, it was shown that compositions which contained fine zirconia with a particle size finer than 150 mesh had poor spalling resistance. A test was carried out showing that an acceptable level of spalling resistance could be attained in a composition that contained fine zirconia if a quantity of coarse zirconia sized greater than 150 mesh Tyler was also included in the composition. The mix and test results are set forth in Table III below.

TABLE III

| Example: | 14 |
|---|---|
| Mix: | |
| Deadburned Magnesite | |
| -10 on 28 mesh | 47% |
| -28 mesh | 17 |
| BM 55 | 10 |
| BM 90 | 6 |
| Zirconia | |
| B | 5 |
| A | 15 |
| Plus additions: | |
| Lignosulphonate | 3.9 |
| Oil | 0.5 |
| Burn: | 2850° F., 2 Hour Hold |
| % Linear Change in Burning: | −0.1 |
| Bulk Density, pcf, (Av 5): | 203 |
| Apparent Porosity, %: | 15.4 |
| Modulus of Rupture, psi, (Av 3) | |
| At Room Temp: | 1700 |
| At 2700° F.: | 1420 |
| Propane Oxygen Flame Impingement-POFI-Test: | passed |

The particular amount and sizing of coarse zirconia which has to be used with a particular amount and sizing of fine zirconia can be readily determined by routine experimentation.

EXAMPLES 15-20

A series of six tests were carried out showing the hot modulus of rupture of the shapes from mixes with magnesite of various purities and the increase in such hot modulus by control of the lime to silica ratio or purity of the magnesite grain. The mix particulars an test results are set forth in Table IV below.

TABLE IV

| | Example: | | | | | |
|---|---|---|---|---|---|---|
| | 15 | 16 | 17 | 18 | 19 | 20 |
| Mix: | | | | | | |
| Deadburned Magnesite | 95.2% | 95% | 95% | 95% | 95% | 95.2% |
| Zirconia B | 4.8 | 5 | 5 | 5 | 5 | 4.8 |
| Plus additions: | | | | | | |
| VS Silica | 0.23 | — | — | — | — | 0.14 |
| Lignosulphonate | 3.71 | 3.9 | 3.9 | 3.9 | 3.8 | 3.71 |
| Oil | 0.48 | 0.5 | 0.5 | 0.5 | 0.5 | 0.48 |
| Density, pcf,: | 186 | 188 | 188 | 185 | 189 | 188 |
| Apparent Porosity, %: | 17.2 | 17.5 | 17.8 | 18.2 | 17.0 | 17.4 |
| Modulus of Rupture, psi, (Av 3) | | | | | | |
| At Room Temp: | 1770 | 1580 | 1230 | 1520 | 1350 | 1840 |
| At 2700° F.: | 160 | 150 | 160 | 220 | 380 | 420 |
| Mix Chemical Analysis (Calcined Basis) | | | | | | |
| Silica | 0.94% | 0.44% | 0.28% | 0.12% | 0.03% | 0.88% |
| Alumina | 0.21 | 0.17 | 0.14 | 0.11 | 0.07 | 0.20 |
| Titania | *0.01 | 0.02 | 0.02 | 0.01 | 0.01 | *0.01 |
| Iron Oxide | 0.18 | 0.17 | 0.21 | 0.42 | 0.04 | 0.30 |
| Chromic Oxide | *0.01 | 0.01 | 0.21 | 0.03 | 0.02 | *0.01 |
| Lime | 2.20 | 1.16 | 1.24 | 0.80 | 0.72 | 2.20 |
| Zirconia | 4.32 | 4.00 | 4.48 | 4.80 | 4.93 | 4.33 |
| Boron Oxide | 0.013 | 0.005 | 0.017 | 0.009 | *0.005 | 0.016 |
| Total Analyzed | 7.87% | 5.98% | 6.60% | 6.3% | 5.82% | 7.94% |
| By Difference | | | | | | |
| Magnesia | 92.13 | 94.02 | 93.40 | 93.7 | 94.18 | 92.06 |
| Total | 100.0% | 100.0% | 100.0% | 100.0% | 100.0% | 100.0% |
| Lime-to-Silica Ratio: | 2.34 | 2.64 | 4.43 | 6.62 | 2.4 | 2.50 |
| Magnesite Chemistry (Calcined Basis) | | | | | | |
| Silica | 0.82% | 0.45% | 0.29% | 0.18% | 0.04% | 0.82% |
| Alumina | 0.16 | 0.18 | 0.09 | 0.09 | 0.10 | 0.16 |
| Titania | *0.01 | 0.01 | *0.01 | 0.01 | *0.01 | *0.01 |
| Iron Oxide | 0.13 | 0.16 | 0.18 | 0.37 | 0.10 | 0.13 |
| Chromic Oxide | *0.02 | *0.01 | 0.21 | *0.02 | 0.08 | *0.02 |
| Lime | 2.30 | 1.17 | 1.23 | 0.60 | 0.54 | 2.30 |
| Boron Oxide | 0.024 | *0.005 | 0.028 | 0.02 | *0.005 | 0.024 |
| Total Analyzed | 3.43% | 2.00% | 2.03% | 2.03% | 0.86% | 3.43% |
| By Difference | | | | | | |
| Magnesia | 96.57 | 98.00 | 97.17 | 97.97 | 99.14 | 96.57 |
| Total | 100.0% | 100.0% | 100.0% | 100.0% | 100.0% | 100.0% |

*Those chemistry numbers that are accompanied by asterisks indicate that the limit of detectability was reached for that particular oxide. Thus, the actual value is lower than that indicated.

EXAMPLE 21

The adjustment of the amount and sizing of the zirconia also makes it possible to get adequate refractoriness with magnesites of lower purity. This is illustrated in this example in which the magnesite of Example 17 is used but with the type of zirconia addition set forth in Table V below. The results are also shown in Table V.

TABLE V

| Example: | 21 |
|---|---|
| Mix: | |
| Magnesite | 80% |
| Zirconia B | 5 |
| Zirconia A | 15 |
| Density, pcf: | 202 |
| Apparent Porosity, %: | 15.7 |
| Modulus of Rupture, psi | |
| At Room Temperature: | 1530 |
| At 2700° F.: | 1120 |
| POFI Test: | passed |

As is evident, even though a magnesite of purity less than 98.5% was used, a product with very high hot strength was obtained.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. In a slide gate assembly comprising at least one plate of basic refractory material, the improvement comprising said at least one plate being one resulting from firing a batch consisting essentially of a magnesite and a zirconia; said batch consisting essentially of for each 100 percent by weight thereof about 3 to 20 percent by weight of coarse zirconia having a particle size of 150-mesh Tyler, or greater, and 0 to 20 percent by weight of fine zirconia having a particle size of finer than 150-mesh Tyler.

2. The slide gate assembly of claim 1 also including a nozzle of basic refractory material resulting from firing a batch consisting essentially of a magnesite and a zirconia; said batch consisting essentially of for each 100 percent by weight thereof about 3 to 20 percent by weight of coarse zirconia having a particle size of 150-mesh Tyler, or greater, and 0 to 20 percent by weight of fine zirconia having a particle size of finer than 150-mesh Tyler.

3. The slide gate assembly of claim 1 or 2 wherein said fine zirconia is present in an amount of from about 1 to 20 percent by weight.

4. The slide gate assembly of claim 1 or 2 wherein the lime-to-silica ratio in the magnesite is greater than about 1.88 to 1.

5. The slide gate assembly of claim 1 or 2 wherein the zirconia is baddeleyite.

* * * * *

UNITED STATES PATENT AND TRADEMARK OFFICE
CERTIFICATE OF CORRECTION

PATENT NO. : 4,847,222

DATED : July 11, 1989

INVENTOR(S) : KNAUSS et al.

It is certified that error appears in the above-identified patent and that said Letters Patent is hereby corrected as shown below:

Column 3, line 24 and Col. 4, line 5 should each show dash "--" marks on either side of "280°F., 2 Hour Hold" to indicate that such burn conditions are employed for all the Examples in the Tables.

Column 3, last two lines should show dash "--" marks of both sides of "3.80" and "0.50" to indicate these amounts are employed for all the Examples in the Table.

Signed and Sealed this

Twenty-fourth Day of April, 1990

Attest:

HARRY F. MANBECK, JR.

*Attesting Officer*      *Commissioner of Patents and Trademarks*